United States Patent Office 2,698,671
Patented Jan. 4, 1955

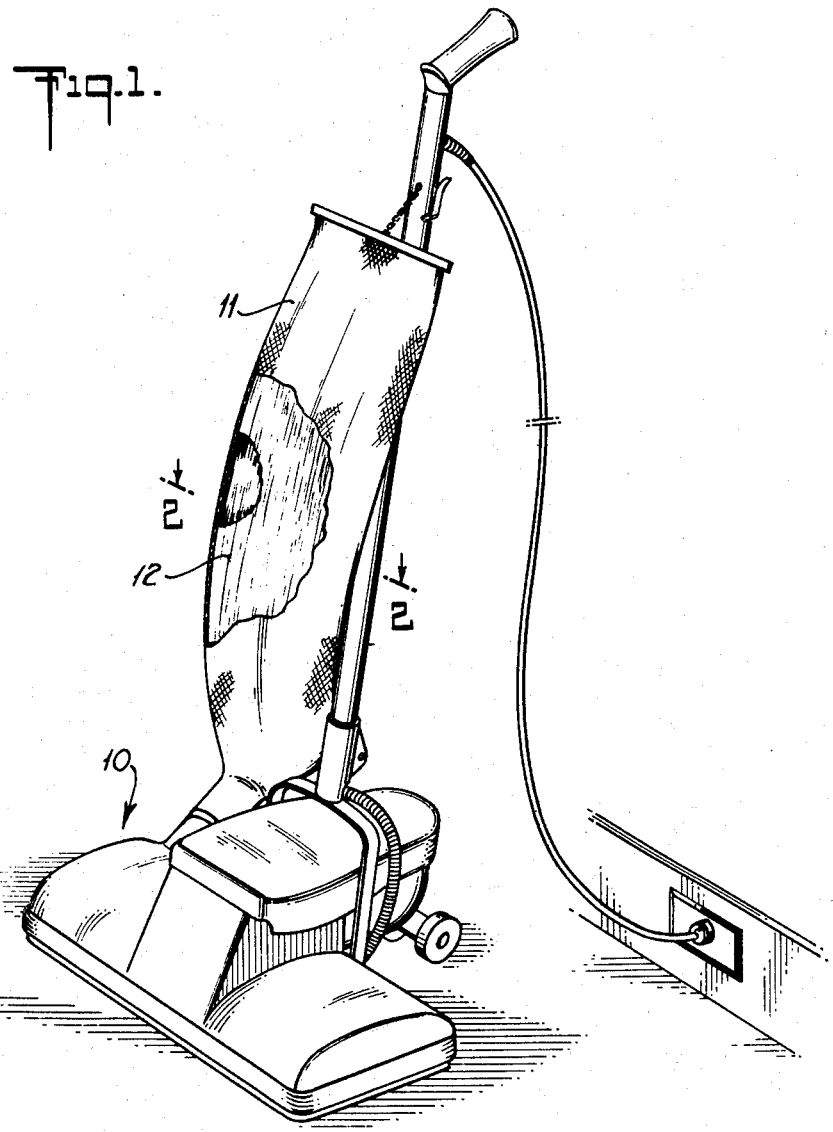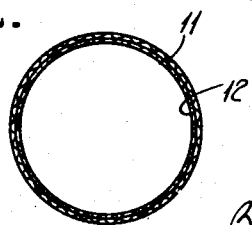

2,698,671

AIR FILTER

Heath O. Kennette and John K. Sumner, Plainfield, N. J., assignors to Chicopee Manufacturing Corporation, a corporation of Massachusetts Application May 4, 1951, Serial No. 224,620

7 Claims. (Cl. 183—51)

This invention relates to air filters. It is particularly useful in making vacuum cleaner bags and will be described for example as applied to such bags.

Many disposable filters have been attempted, especially disposable vacuum cleaner bags which are intended not to be shaken out nor cleaned, but to be discarded when filled with dirt. An example is shown in the Patent 2,251,252 to Lovell who discusses the problem and notes some of the desirable characteristics of such filters, including high dust retention and low air resistance. We have discovered a combination of ingredients forming an impregnant which when applied to textile fibers provides an improved and effective filter having low air resistance and high dust separating and retaining ability, and accordingly we apply our discovery to the making of improved filters with the object of providing these desirable characteristics to a high degree. In applying our discovery it is also among our objects to provide a highly flexible or soft inner disposable bag to be placed within standard non-disposable or permanent bags and which will prevent contamination or soiling of the permanent bags.

In the accompanying drawings:

Fig. 1 is a perspective view of a vacuum cleaner to which our invention is applied, and Fig. 2 is a cross section of the air bag or filter.

In Fig. 1, 10 represents any suitable vacuum cleaner which has a usual form of permanent, or non-disposable fabric bag 11 which forms an air filter. Such bags are usually made of closely woven cotton fabric and are intended to separate and retain most of the dust entrained in air blown through them. If the bags are closely woven enough to separate substantially all the dust, they offer an undesirably high air resistance which reduces the effectiveness of the cleaner, particularly its strength in picking up relatively heavy particles. On the other hand if the bag is loosely woven to reduce air resistance, it passes dust. Impregnation of loosely woven bags with oil increases dust retention without substantial increase of air resistance. However, oily impregnation while satisfactory in industrial installation, is accompanied by an undesirable characteristic particularly if the filter medium is employed in the household as is the case with household vacuum cleaner filter bags. If, in cleaning or removing the filter bag, it is placed in contact with a household object such as the finished surface of furniture, or a fabric such as upholstery, or paper, the oil migrates to the household furnishing, damaging the finish of furniture and staining and/or soiling upholstery, rugs, wall paper, and the like. In many instances permanent damage to household objects and furnishings may result from such migration.

These and other disadvantages of prior filter media can be substantially completely obviated with the new and improved filter medium of the present invention. Our filter media consist basically of two major components, namely (1) an air-permeable fabric base, woven or non-woven of any suitable size and shape or configuration adapted to the intended end-use or application; and (2) a dust retaining impregnant comprising (a) an oil and (b) an oil migration retarding agent which prevents the oil from migrating to any material with which the filter is brought into contact (e. g. wood, fabric or paper), but which does not substantially impair the dust retaining characteristics of the oil in the impregnant.

The preferred oil migration retarding agent in accordance with one aspect of the invention comprises any one or more of a large number of substantially non-volatile hydrophylic organic polar compounds containing a sufficient number of water-solubilizing groups (e. g. the —OH group, the —NH$_2$ group, the —COONa group and the like) to render the compound readily water soluble. In general, polyfunctional organic compounds of the above type are preferred. By way of example mention may be made of the following: glycols such as glycerine, ethylene glycol, propylene glycol, butylene glycol and the like; sorbitol, manitol and related compounds; glycerine substitutes such as glyceryl amines; alkalanol amines such as ethanol amine, diethanol amine, triethanol amine and the like; water dispersible cellulose derivatives such as methyl cellulose, carboxymethyl cellulose and the like.

For economic reasons, the preferred type of oil migration retarder comprises the glycols, including particularly butylene glycol, glycerine, or commercial glycerine substitutes such as glyceryl amine complexes. Also in some cases it is desirable to use one or more of the water dispersible cellulose derivatives (either alone or in combination with a glycol, for example) in order to impart other properties such as stiffness or strength or "hand" to the resultant fabric.

In order more clearly to disclose the nature of the invention and the manner in which it may be carried into practice, certain specific examples will hereinafter be described in detail. It should clearly be understood however that these examples are merely illustrative of the basic principles involved and are not intended to limit or delineate the breadth of the invention or the scope of the appended claims.

Example 1

We may impregnate any suitable fabric to form the filter but prefer to impregnate a loosely associated web of unspun and unwoven textile fibers, which may, if desired, be bonded at spaced points or lines, for example as is disclosed in the Goldman Patent 2,039,312. Also we prefer to use a mixture of about 75% bleached or absorbent cotton fibers strengthened by the inclusion of about 25% rayon fibers, as we have found bleached or absorbent cotton superior to other fibers in its dust-retaining properties, especially when impregnated in accordance with our invention.

We prefer to form a bag or filter 12 of this impregnated web and to place it within the conventional bag 11, although it is equally suitable as a disposable filter to be used with any standard filter or other means for supporting the impregnated fibrous web.

In impregnating the web we take any suitable non-woven fibrous web, preferably one weighing about 500 grains per square yard, fiber weight. This web may be, for example, a standard card web, either not bonded or bonded as disclosed by the Goldman patent.

The web is dipped in an emulsion made up as follows:

|  | Lbs. |
|---|---|
| 10% solution of thin boiling starch | 200 |
| Glycerine | 20 |
| Mineral oil emulsion | 20 |

The mineral oil emulsion may be made according to the following formula:

|  | Lbs. |
|---|---|
| Mineral oil | 82 |
| Oleic acid | 12 |
| Triethanolamine | 4 |
| Water | 100 |

Other suitable emulsifiers and dispersants can be used instead of the oleic acid and triethanolamine within the skill of the art.

After dipping, the web is squeezed and dried. This leaves a residue, uniformly distributed through the fibers of the web, of a mixture of

|  | Per cent |
|---|---|
| Starch solids | 40 |
| Glycerine | 40 |
| Mineral oil (including residues of emulsifiers, in this case triethanolamine oleate) | 20 |

These residues of the emulsifiers and dispersants do not affect the mineral oil when the fibers are dried, and when we use the term "mineral oil," especially when stating proportions, we wish it understood that this term includes the residues, if any are present.

Before or after the fibrous web has been dried, it may be bonded (if not already bonded) by any suitable adhesive as disclosed by Goldman.

Example II

In this example, the procedure is similar to that of Example I except that the glycerine in the impregnant formulation is replaced with a commercial glycerine substitute comprising a complex mixture containing glyceryl amines. One particularly satisfactory substitute is sold by Haas Miller Corporation of Philadelphia under the trade name "Glycola."

Example III

The procedure is identical with that of Example I except that the glycerine is replaced by a mixture consisting of 75% carboxymethyl cellulose and 25% butylene glycol.

Example IV

The procedure of Example I was followed except that 75% of the glycerine was replaced by carboxymethyl cellulose.

When a web weighing about 500 grains per square yard, fiber weight, is impregnated according to any of the foregoing examples, the impregnant content of resultant fabric after drying is about 35% of the weight of the fiber. We can vary this percentage by suitable expedients, for example, by varying the percentage of water in the impregnating emulsion. However we prefer to have the final content of impregnant not less than about 20% nor more than about 50% of the fiber weight as we have found that less than 20% passes undesirable amounts of dust and more than 50% increases the air resistance undesirably.

Likewise we can vary the proportions of oil and oil migration retarder, within wide limits. However optimum performance is obtained with certain rather broad limits, depending upon the specific agents used. If, for example, the ratio of mineral oil (including emulsifier residues) to glycerine is greater than about 25/35, the oil will migrate from the inner filter to any objects it touches in use or handling, with resulting staining and discoloring. If, on the other hand, more glycerine is used than represented in the ratio 20/40, the excess glycerine accomplishes no appreciable benefit and is wasted. We therefore prefer to use a ratio of oil to oil migration retarder between 25/35 and 20/40. Likewise the relationship between the glycerine and starch is important for optimum results. The starch enhances the dust retaining property of the filter, but increasing the starch-to-glycerine ratio above 1 to 1 makes the fabric undesirably stiff. This prevents its conforming to the supporting structure, which makes rupturing of the filter more likely to occur.

By using an inner bag 11, made in accord with our invention, we are enabled to use a light and inexpensive supporting bag 12 of woven fabric. The inner bag retains substantially all the dust without contaminating the outer bag, which serves as a support. Oil migration is substantially eliminated as indicated by the fact that none takes place even when the resultant filter is tightly wrapped with bibulous paper and stored overnight.

The fabric made in accordance with any of the foregoing examples may be converted into any suitable form, such as a bag of conventional shape, by sewing, gluing, or heat sealing the fabric into the desired form, using any of the conventional techniques well known in the art.

A filter bag made in accordance with Examples I to IV has excellent dust retention characteristics; relatively low resistance to the flow of air, as indicated by low pressure drop; and substantially complete freedom from oil migration tendencies, even at high humidity.

Dust retention was tested by placing a vacuum cleaner bag made in accordance with the invention in a standard household vacuum cleaner and then picking up with the nozzle of the vacuum cleaner a synthetic dirt mixture consisting of 160 grams of sand intimately blended with 240 grams of finely divided talc. In the case of test bags made in accordance with Example I to IV, the weight of synthetic dust retained in the bag averaged between 99 to 100% of the original amount of synthetic dirt.

Air flow resistance was determined by inserting a two layer sample of fabric between the cap and the tank body of a standard tank-type household vacuum cleaner equipped with two manometers so arranged as to reflect on a relative scale, the pressure drop across the test specimen. The order of magnitude of the pressure drop as measured in this test was significantly lower with test specimens of the present invention than with test specimens made from any other vacuum cleaner bag tested, including disposable bags of paper and nonwoven fabric and the nondisposable bag of woven fabric of the type normally used in such vacuum cleaners.

Oil migration was tested by placing a piece of test fabric on kraft paper, rolling the two into a tight roll, storing the roll at high humidity with a rubber band around the roll, for several hours or overnight and then examining the kraft paper for evidence of oil stain. With test specimens made without the use of the oil migration retarder, the kraft paper was stained over the entire area covered by the specimen, usually in one hour. With test specimens in accordance with the present invention, essentially no oil stain was observed even when the test was carried out overnight. In addition the fabric of the present invention does not have the oily or unctuous feel or hand characteristic of all prior oil impregnated filter media.

It is then apparent that the product of the present invention is highly effective in dust retention, free of objectionable staining properties and characterized by low air flow resistance. Furthermore, in its preferred embodiment it can be manufactured at sufficiently low cost to provide a cheap disposable unit. In addition, our fabric is sufficiently flexible and extensible to conform to the shape of the container, in this and other respects being far superior to paper.

As used in the specification and claims the term glycol is intended to include glycerine as well as ethylene glycol, propylene glycol, butylene glycol and related compounds.

It will be readily apparent to those skilled in the art that many modifications of the specific embodiments are readily possible without departing from the spirit and scope of the present invention. For example, in lieu of mineral oil employed in the examples, we may use any water insoluble oleaginous material normally used in the filter art as a dust retaining aid in lieu of mineral oil. Thus excellent results may be attained by substituting butyl stearate and like oily materials for the mineral oil of Example I to IV. Likewise other stiffening agents well known in the textile art may be used in place of starch.

All such modifications, variations and extensions are to be understood as embraced within the ambit of the appended claims.

We claim:

1. An air filter comprising in combination unspun and unwoven textile fibers loosely associated in a web, the fibers including about 75% bleached absorbent cotton and about 25% rayon, the web being impregnated with a dust retaining impregnant comprising about 40% starch solids, about 20% mineral oil and about 40% of at least one water-soluble polyhydric alcohol.

2. An air filter comprising in combination unspun and unwoven textile fibers loosely associated in a web, the web being impregnated with a dust retaining medium comprising about 40% starch solids, from about 20% to about 25% mineral oil and a mixture of about 75% carboxymethyl cellulose and about 25% butylene glycol.

3. An air filter adapted to separate air from particles suspended therein comprising a cellulosic fabric filter base impregnated with a dust retaining impregnant comprising mineral oil, a textile stiffening agent, and an oil migration retarding agent selected from the class consisting of water-soluble hydroxy amino aliphatic organic compounds, polyhydroxy aliphatic organic compounds having not more than six carbon atoms, and water dispersible cellulose ethers.

4. An air filter adapted to separate air from particles suspended therein comprising a cellulosic fabric filter base impregnated with 20% to 50% of its weight of a dust retaining impregnant comprising mineral oil and an oil migration retarding agent selected from the class consisting of water-soluble hydroxy amino aliphatic organic compounds, polyhydroxy aliphatic organic compounds having not more than six carbon atoms, and water dispersible cellulose ethers, the ratio of the oil to the oil migration retarding agent in the dust retaining impregnant being within the range of from 25 to 35 to 20 to 40.

5. An air filter according to claim 4 in which the oil migration retarding agent is butylene glycol.

6. An air filter according to claim 4 in which the oil migration retarding agent is glycerine.

7. An air filter according to claim 4 in which the oil migration retarding agent is carboxymethyl cellulose.

References Cited in the file of this patent

UNITED STATES PATENTS

| Number | Name | Date |
|---|---|---|
| 842,636 | Dressler | Jan. 29, 1907 |
| 2,083,132 | Williams et al. | June 8, 1937 |
| 2,199,385 | Bass | May 7, 1940 |
| 2,347,031 | Cupery | Apr. 18, 1944 |
| 2,353,936 | Smith | July 18, 1944 |
| 2,443,766 | Hedburg | June 22, 1948 |
| 2,579,984 | Trowbridge | Dec. 25, 1951 |